(12) United States Patent
Gonin et al.

(10) Patent No.: US 8,251,437 B2
(45) Date of Patent: Aug. 28, 2012

(54) FRONT ASSEMBLY FOR A MOTOR VEHICLE COMPRISING A FRONT BUMPER SHIELD

(75) Inventors: Vincent Gonin, Sochaux (FR); Julien Dufee, Novillard (FR); Laurent Droz Bartholet, Hericourt (FR)

(73) Assignee: Faurecia Bloc Avant, Nanterre (FR)

( * ) Notice: Subject to any disclaimer, the term of this patent is extended or adjusted under 35 U.S.C. 154(b) by 209 days.

(21) Appl. No.: 12/641,749

(22) Filed: Dec. 18, 2009

(65) Prior Publication Data

US 2010/0244472 A1   Sep. 30, 2010

(30) Foreign Application Priority Data

Mar. 26, 2009   (FR) ...................... 09 01438

(51) Int. Cl.
*B60R 19/02* (2006.01)
*B60R 19/36* (2006.01)
(52) U.S. Cl. .................. 296/187.09; 293/146
(58) Field of Classification Search ............. 296/187.09, 296/187.03, 187.04; 293/102, 132, 146
See application file for complete search history.

(56) References Cited

U.S. PATENT DOCUMENTS

| | | | | |
|---|---|---|---|---|
| 5,277,465 | A * | 1/1994 | Weir | 293/142 |
| 7,533,927 | B2 * | 5/2009 | Ito et al. | 296/187.03 |
| 7,597,383 | B2 * | 10/2009 | Itou et al. | 296/187.04 |
| 7,699,383 | B2 * | 4/2010 | Fukukawa et al. | 296/187.04 |
| 2002/0047281 | A1 * | 4/2002 | Hartel et al. | 293/102 |
| 2007/0200375 | A1 * | 8/2007 | Ito et al. | 293/102 |
| 2010/0102577 | A1 * | 4/2010 | Ginja et al. | 293/102 |
| 2010/0127520 | A1 * | 5/2010 | Ginja et al. | 293/146 |
| 2010/0244487 | A1 * | 9/2010 | Gonin et al. | 296/187.09 |
| 2010/0308607 | A1 * | 12/2010 | Ginja | 293/132 |
| 2010/0314905 | A1 * | 12/2010 | Mori | 296/187.03 |
| 2011/0115241 | A1 * | 5/2011 | Gonin | 293/120 |
| 2011/0121586 | A1 * | 5/2011 | Gonin | 293/132 |
| 2011/0127783 | A1 * | 6/2011 | Shimotsu et al. | 293/132 |
| 2011/0156414 | A1 * | 6/2011 | Gonin et al. | 293/132 |
| 2011/0175379 | A1 * | 7/2011 | Erzgraber et al. | 293/132 |

FOREIGN PATENT DOCUMENTS

| | | |
|---|---|---|
| DE | 102006041095 | 3/2008 |
| EP | 1000840 | 5/2000 |
| EP | 1419936 | 5/2004 |
| EP | 1698520 | 9/2006 |
| FR | 2932766 A1 * | 12/2009 |
| WO | WO 2008087346 A2 * | 7/2008 |

OTHER PUBLICATIONS

FR Search Report dated Aug. 25, 2009 from corresponding FR0901438.

* cited by examiner

*Primary Examiner* — H Gutman
(74) *Attorney, Agent, or Firm* — Young & Thompson (57) ABSTRACT

The assembly is of the type comprising two pairs of front longitudinal members of a chassis of a motor vehicle and support and fixing mounting plates arranged at the front ends of the longitudinal members and comprising a front bumper shield comprising a one-piece plastics material frame consisting of an upper bumper beam and a lower bumper beam and two vertical members connecting the upper and lower bumper beams, the vertical members of the frame being configured to act as impact absorbers and fixed resting directly against the mounting plates.

10 Claims, 6 Drawing Sheets

FRONT ASSEMBLY FOR A MOTOR VEHICLE COMPRISING A FRONT BUMPER SHIELD

FIELD OF THE INVENTION

The present invention relates to a front assembly for a motor vehicle, of the type comprising at least two pairs of front longitudinal members of a motor vehicle chassis and support and fixing mounting plates arranged at the front ends of the longitudinal members.

BACKGROUND TO THE INVENTION

Modern motor vehicles are designed to respond appropriately to different types of possible frontal impacts, such as low-speed impacts or "parking impacts", at speeds of between 2.5 and 4 kph (ECE42), medium-speed impacts or "repairable impacts", at speeds of about 16 kph (Danner) and high-speed impacts, at speeds of between 56 and 65 kph.

Modern motor vehicles are also designed to protect pedestrians in pedestrian impacts, and in particular to protect the legs and hips of the pedestrian.

It is possible to provide a front assembly comprising an upper metal bumper beam fixed to the ends of front upper longitudinal members of a high channel (main shafts) by means of first metal impact absorbers attached to the upper bumper beam, and a lower bumper beam fixed to the ends of front lower longitudinal members of a low channel (cradle extensions) by means of second metal or plastics material impact absorbers attached to the lower bumper beam.

However, such a front assembly is complicated and costly to manufacture and install.

An object of the present invention is to propose a front assembly which can respond appropriately to pedestrian impacts and to low- and medium-speed impacts, while being simple and having a low manufacturing cost.

SUMMARY OF THE INVENTION

Accordingly, the invention proposes a front assembly for a motor vehicle of the above-mentioned type, wherein it comprises a front bumper shield comprising a one-piece plastics material frame consisting of an upper bumper beam and a lower bumper beam and two vertical members connecting the upper and lower bumper beams, the vertical members of the frame being configured to act as impact absorbers and fixed resting directly against the mounting plates.

According to other embodiments, the front assembly comprises one or more of the following characteristics, taken in isolation or in any of the technically possible combinations:
  the vertical members have a thickness of between 120 and 220 mm;
  the vertical members are fixed to the mounting plates by screwing and/or bonding;
  the shield has front and rear faces and the vertical members have a cellular structure consisting of cells extending longitudinally through the vertical members and opening on at least one of the rear and front face of the shield;
  each vertical member comprises first blind cells, closed on the rear face side and open on the front face side, and second blind cells open on the rear face side and closed on the front face side;
  the upper bumper beam is double and comprises two vertically spaced cross members;
  each pair of longitudinal members comprises an upper longitudinal member and a lower longitudinal member connected to one another by a common fixing mounting plate extending over the entire height separating the upper longitudinal member from the lower longitudinal member, each vertical member being applied to the common mounting plate substantially over its entire height;
  it comprises at least a front pedestrian absorption rib projecting forwards from a vertical member; and
  a front pedestrian absorption rib extended laterally to be applied to one of the upper or lower bumper beams.

The invention also relates to a front bumper shield for a motor vehicle comprising a one-piece frame consisting of an upper bumper beam and a lower bumper beam and two vertical members connecting the upper and lower bumper beams, provided for incorporation into a front assembly for a motor vehicle according to any one of the preceding claims, the vertical members of the shield being configured to act as impact absorbers and suitable for being fixed resting directly against the mounting plates.

The invention and its advantages will be better understood on reading the description that follows, given solely as an example and with reference to the accompanying drawings.

DETAILED DESCRIPTION OF THE PREFERRED EMBODIMENT

Figure 1:
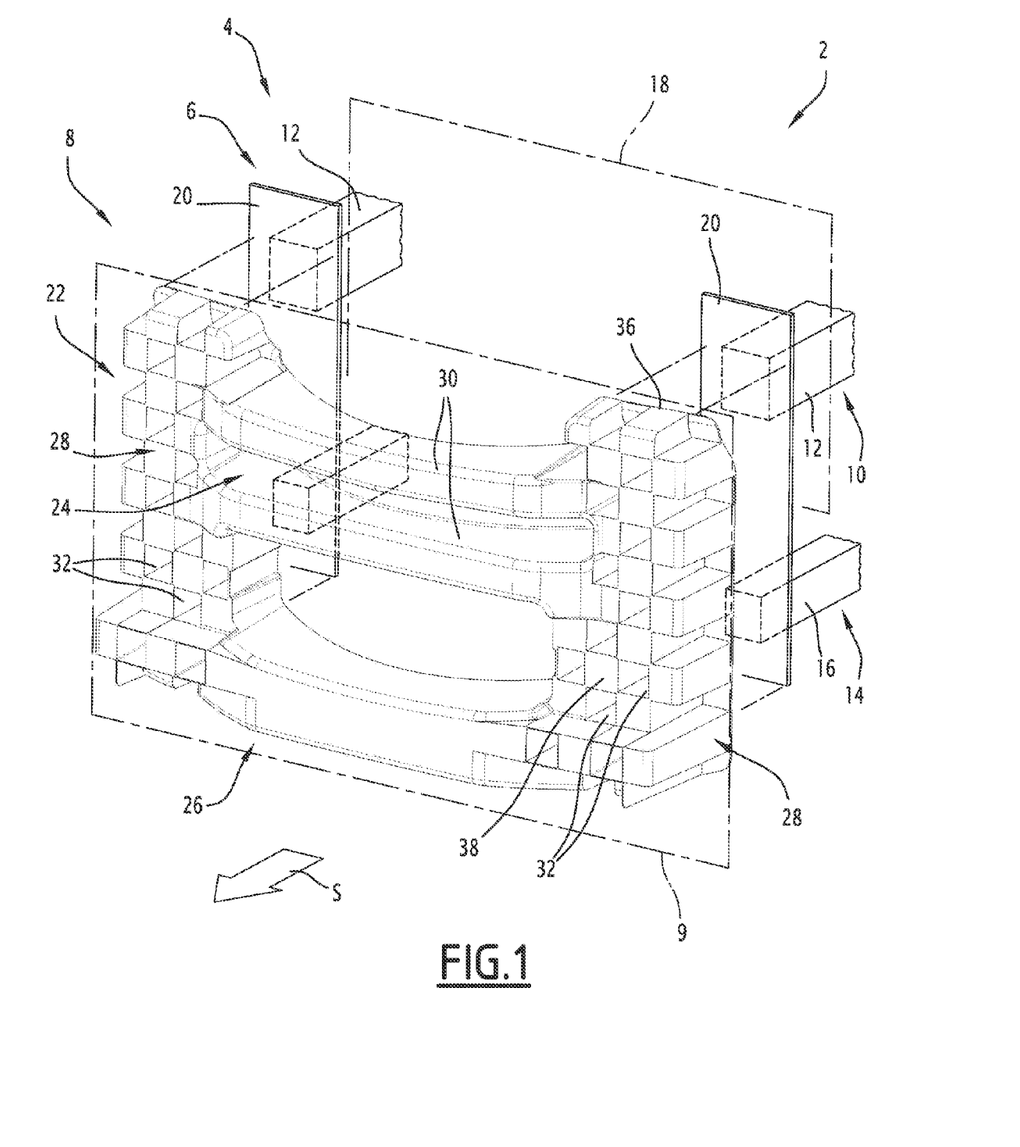
FIG. 1 is an exploded diagrammatic perspective view of a first front bumper assembly according to the invention.

In the rest of this document, the orientation terms should be understood with reference to the usual orientation of motor vehicles, illustrated in FIG. 1 by the arrow S pointing horizontally forwards in a longitudinal direction of the motor vehicle.

Figure 2:
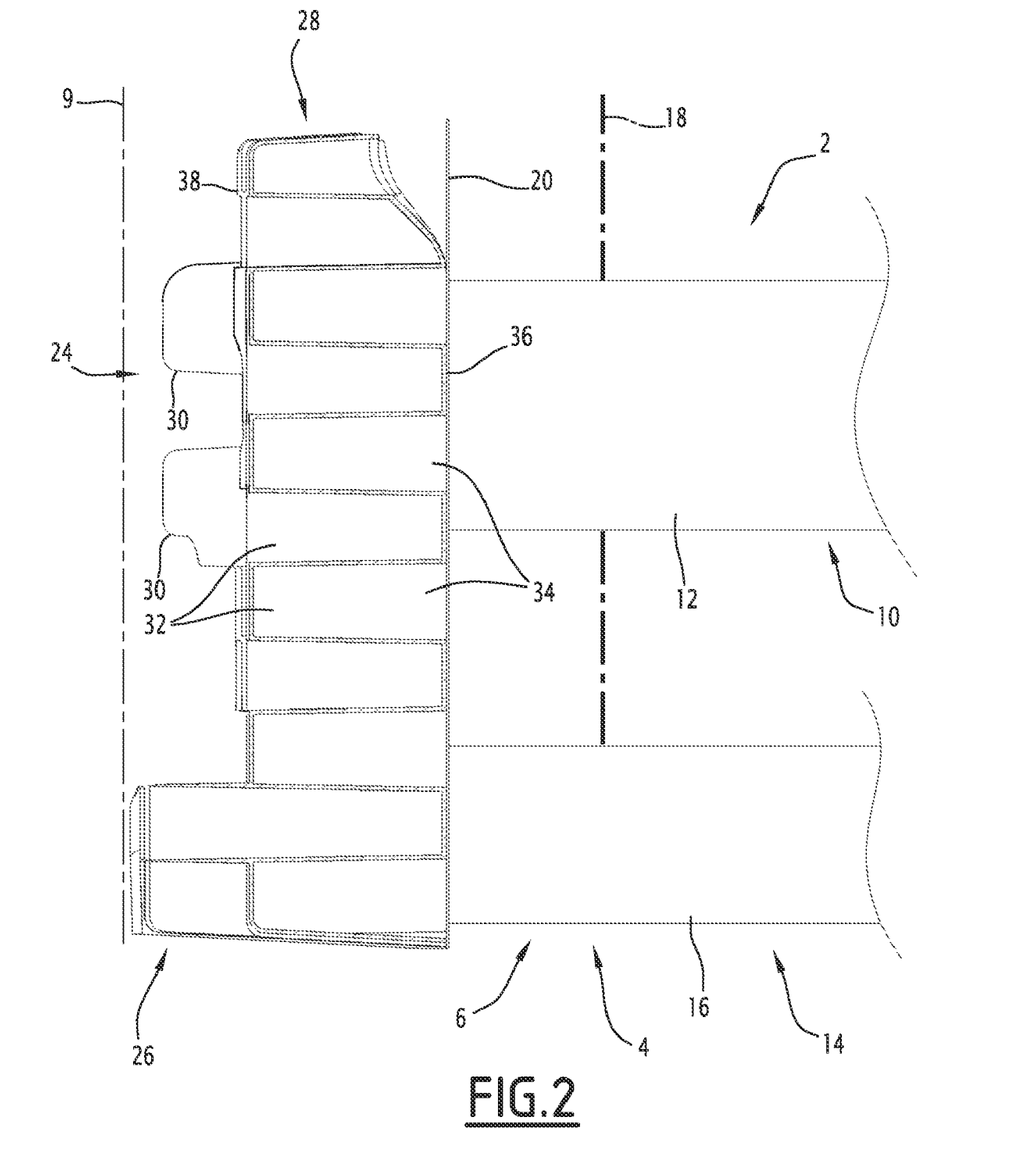
FIG. 2 is a side view in cross-section of the assembly of FIG. 1.

As illustrated in FIGS. 1 and 2, a motor vehicle 2 comprises a chassis 4 comprising a front portion 6, a front bumper shield 8 arranged at the front end of the front portion 6 to protect the front portion 6 in case of impact, and a bumper shell 9 to cover the shield 8.

The front portion 6 comprises a high channel 10 comprising a pair of upper longitudinal members 12, or shafts, and a low channel 14 comprising a pair of lower longitudinal members 16, or cradle extensions.

The upper longitudinal members 12 extend longitudinally and are spaced transversely from one another.

The lower longitudinal members 16 extend longitudinally and are spaced transversely from one another. The transverse gap between the lower longitudinal members 16 is substantially equal to that between the upper longitudinal members 12.

The upper longitudinal members 12 are calibrated to absorb without buckling a maximum axial force of between 80 kN and 100 kN. The lower longitudinal members 16 are calibrated to absorb without buckling a maximum axial force of between 25 kN and 45 kN. On some vehicles with non-average dimensions, the calibration ranges proposed may differ slightly, without departing from the scope of the invention.

The upper longitudinal members 12 are provided to receive between them and support at least in part a front face 18. The front face 18 is illustrated diagrammatically in FIG. 1 by a rectangle in dotted and dashed lines. In a known manner, the front face 18 comprises a support frame fitted with functional devices of an engine cooling system of the vehicle and/or an air conditioning system, such as one or more radiators or a motor-ventilator set.

The front face 18 is fixed to the upper longitudinal members 12 and to wing longitudinal members supporting the wings of the body, situated above the upper longitudinal members and set back in relation to the upper longitudinal members 12.

The front face 18 is set back to the rear of the front ends of the upper 12 and lower 16 longitudinal members.

The front portion 6 comprises a pair of fixing mounting plates 20 arranged at the front ends of the upper 12 and lower 16 longitudinal members. Each mounting plate 20 connects the front end of an upper longitudinal member 12 to that of the adjacent lower longitudinal member 16 situated on the same side. Each mounting plate 20 is in the form of a metal plate extending in a substantially vertical transverse plane. The mounting plates 20 may be produced in stamped, rolled or folded steel, or in a light alloy.

The shell 9 is a front body element of the vehicle and defines the outer curve thereof.

The shield 8 is arranged between the shell 9, which covers it, and the front portion 6. Its function is to absorb low-speed and medium-speed (Danner) impact energy so as to preserve the chassis 4, and protect a pedestrian in the case of a pedestrian impact.

The shield 8 is arranged at the front ends of the upper 12 and lower 16 longitudinal members by being fixed resting longitudinally against the mounting plates 20. The shield 8 is arranged in front of the front face 18 so as to protect it and the functional devices that it carries.

Figure 3:
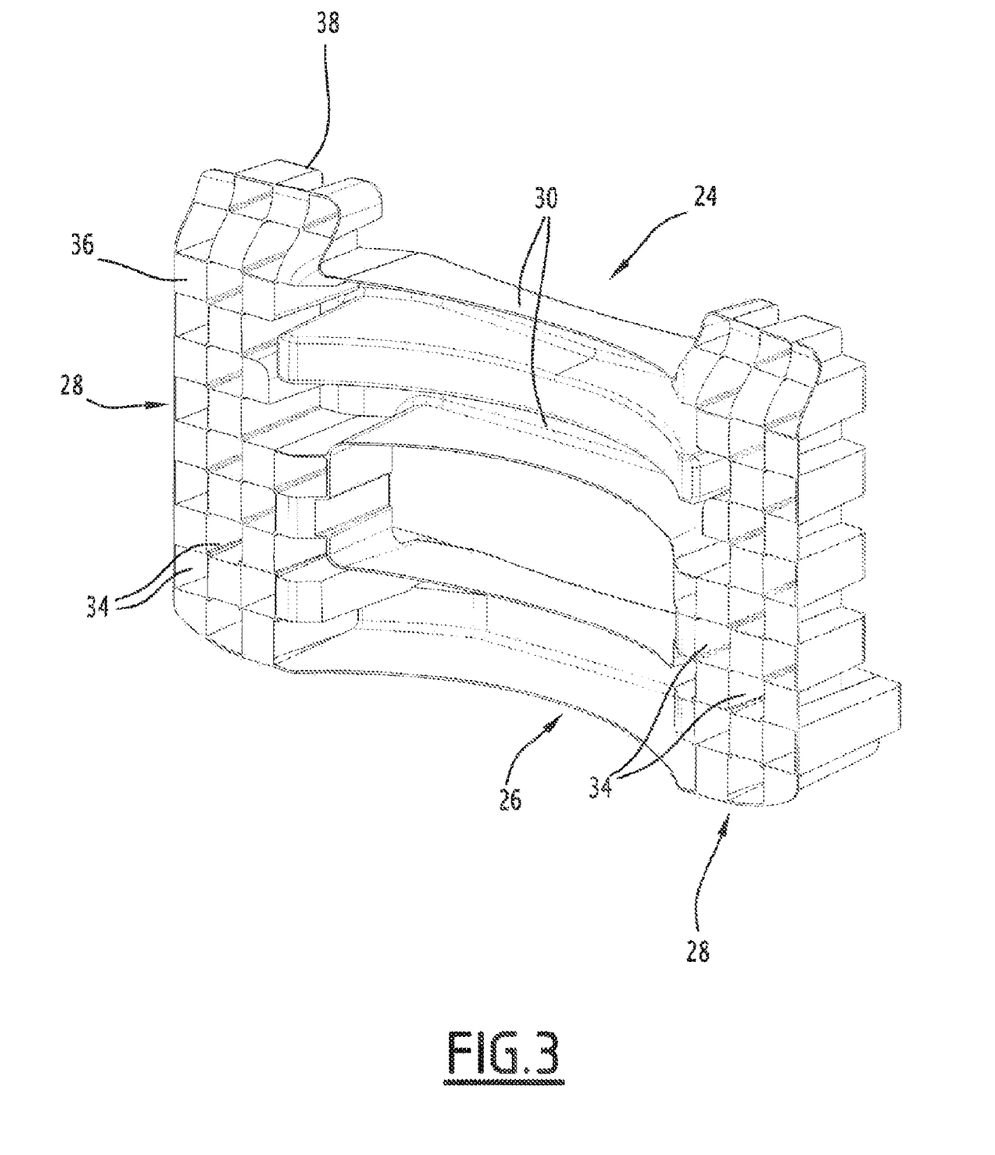
FIG. 3 is a three-quarter rear perspective view of a front bumper shield of the assembly of FIGS. 1 and 2.

The shield 8 comprises a one-piece frame 22 consisting of an upper bumper beam 24 situated at the level of the high channel 10, a lower bumper beam 26 situated at the level of the low channel 12 and two vertical members 28 connecting the bumper beams 24, 26 to one another.

The bumper beams 24, 26 extend substantially transversely and horizontally. They are spaced vertically from one another. The vertical members 28 extend substantially vertically between the bumper beams 24, 26.

The function of the bumper beams 24, 26 is to channel the impact energy towards the vertical members 28 in case of a collision. The lower bumper beam 26, or "pedestrian bumper beam", also has the function of protecting the legs of the pedestrian in the event of pedestrian impact.

The lower bumper beam 26 is arranged to impact on the leg of a pedestrian below the knee, whereas the upper bumper beam 26 is arranged to impact on the leg of the pedestrian substantially level with the knee.

The vertical width of the upper bumper beam 24 is between 100 mm and 200 mm, preferably between 120 mm and 150 mm, which represents an increase of 30% to 80% compared with the vertical width of conventional metal upper bumper beams, the height of which is conventionally between 70 mm and 90 mm. This produces better compatibility with the knee of the pedestrian (reduced shear), because of lower sensitivity to variations in the body of the pedestrian (size of the tibia) or to the attitude of the vehicle (degree of loading, braking attitude). The advantage is identical in the parking impact or low-speed compatibility impact configuration. Advantageously, the lower bumper beam 26 is more rigid and forward of the upper bumper beam 24 to provide appropriate pedestrian protection.

In this example, the upper bumper beam 24 is double and comprises at least two parallel horizontal members 30 spaced vertically. Each member 30 has a U-section open horizontally at the rear. The members 30 increase the dimensional stability of the upper bumper beam 24 when bending and twisting. They may have clearances, and in particular be of a sufficient height, so as to facilitate the injection and demoulding of the frame, the height conventionally being between 30 mm and 40 mm). In a variant, the upper bumper beam 24 comprises a single member.

Figure 4:
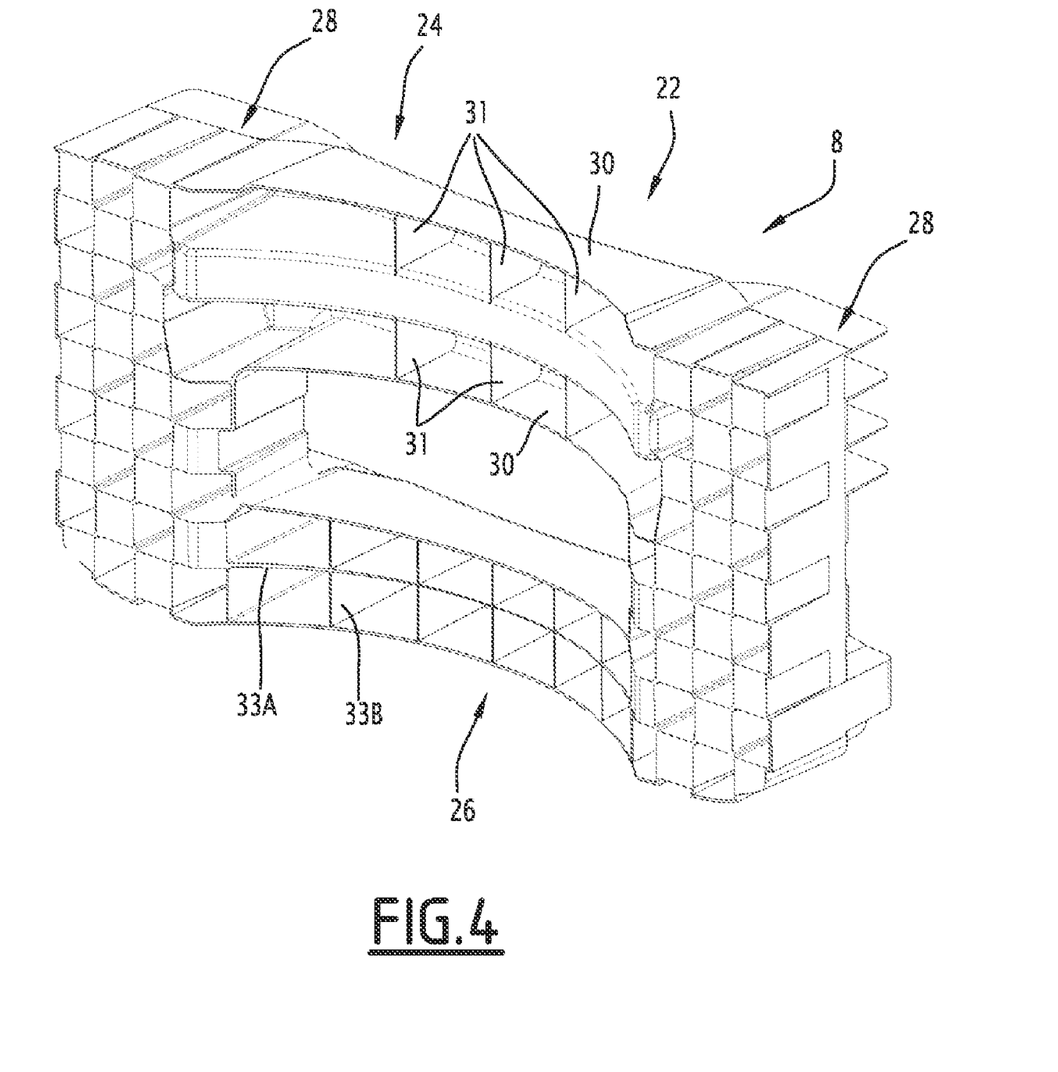
FIG. 4 is a view similar to that of FIG. 3 of a front bumper shield according to a variant.

Optionally, and as illustrated in the variant in FIG. 4, each member 30 comprises vertical longitudinal inner stiffening ribs 31 to give the member 30 the required rigidity. In an advantageous variant, the ribs present in the members 30 are distributed over the width of said members, so that the density of ribs per unit of length when moving along a transverse axis of the vehicle is greater in a central region of the member 30 than the density in the lateral regions of the member 30 situated on either side of the central region.

Thus, the central region extends for example on either side of the centre of the member 30 over a lateral extent of about 200 mm. This central region has for example more than four upper ribs.

The presence of a large number of ribs in the central region allows, for centred pedestrian impact, after impact of the leg of the pedestrian on said central region, a reduction in the deceleration purely by bending of the members 30 over a longitudinal travel of between 50 mm and 70 mm. This is a radically different response from that of a conventional foam absorber which works purely in compression over a comparable travel.

Each lateral region extends between the central region and the vertical members 28 at a distance for example of between 200 mm and 300 mm from the centre of the member 30. The number of ribs in each peripheral region is less than four. Thus, for median pedestrian impact, when the leg of the pedestrian impacts on said lateral region, the reduction in deceleration is produced by a combination of localised bending and compression of said region over a travel of close to 50 mm.

The lower bumper beam 26 has a U-section open horizontally at the rear. The lower bumper beam 26 has a height greater than that of each of the members 30 of the upper bumper beam 24.

Optionally, and as illustrated in the variant in FIG. 4, the lower bumper beam 26 comprises inner stiffening ribs to give the lower bumper beam 26 the required rigidity as described above. As illustrated in FIG. 4, the lower bumper beam 26 comprises a horizontal transverse rib 33A and vertical longitudinal ribs 33B.

The vertical members 28 of the shield 8 are provided to act as energy absorbers between the shell 9 and the mounting plates 20, and to absorb the energy of a low-speed or medium-speed (Danner) impact on the shield 8.

Thus, the vertical members 28 are suitable for being fixed directly resting rigidly against the mounting plates 20, without inserting additional impact absorbers attached between the vertical members 28 and the mounting plates 20.

For a motor vehicle with a mass of between 800 and 1200 kg, the energy to be dissipated in the case of a medium-speed impact (Danner) is usually between 6 and 12 kJ, advantageously between 7 kJ and 10 kJ. Preferably, each vertical member 28 is provided to absorb more than 5 kJ of energy in a medium-speed impact (Danner), preferably between 6 and 10 kJ.

Each vertical member 28 has a cellular structure comprising cells 32, 34 extending longitudinally between a rear face 36 and a front face 38 of the vertical members 28.

Each vertical member 28 comprises reversed blind cells comprising first blind cells 32, closed on the rear face side 36 and open on the front face side 38, and second blind cells 34 open on the rear face side 36 and closed on the front face side 28. The first cells 32 and the second cells 34 are arranged in a quincunx or chequered formation.

Each vertical member 28 is fixed directly on the corresponding mounting plate 20, in contact with and resting rigidly and longitudinally against the mounting plate 20. Each vertical member 28 covers the majority of the support surface provided by the corresponding mounting plate 20.

Each vertical member 28 is fixed on the corresponding mounting plate 20 by screwing or bonding.

This second solution is advantageous in that it gives a good stress distribution. In fact, the design constraints of assembly by screwing (metal inserts, holes, stiffening flanges, spaces for screwdrivers, etc.) are increased, whereas the localised constraints and risks of tearing out caused by screwing are significantly reduced. Moreover, the chosen geometry consisting of reversed blind cells arranged in quincunx formation considerably increases the bonding surface behind the vertical members 28 and helps distribute the stresses favourably.

The very tall, or giant, mounting plates 20 connecting each upper longitudinal member 12 to a lower longitudinal member 16 allow the stresses absorbed by the shield 8 to be distributed over a great height in the vehicle, by virtue of the vertical members 28 extending between the high and low channels.

The giant mounting plates 20 provide a rigid extended support surface to the vertical members 28, allowing the vertical members 28 to work uniformly in compression if there is an impact, without bending in the mid-portion thereof situated vertically between the high channel 10 and the low channel 14. This advantage allows a homogeneous design of the vertical members 28, having similar, uniformly distributed cells, which can be withdrawn longitudinally from the mould and are designed to work basically in compression. The architecture therefore differs radically from structures that do not have giant mounting plates, the vertical members of which must be designed to work by bending.

Therefore, a vehicle equipped with a front assembly according to the invention is less intrusive when it is in contact with another vehicle, and this improves compatibility between vehicles at low and medium speeds.

The size of the support provided by the mounting plates 20 is advantageously between 100 and 180 mm in width, and between 350 and 450 mm in height, corresponding to overall areas of between 3.5 and 8 dm$^2$.

The cellular structure of the vertical members 28 makes manufacturing easier and gives the vertical members an adequate energy absorption capacity over a low depth (in the longitudinal direction).

The frame 22 is produced in one piece for example by injection-moulding a plastics material. It may be withdrawn from the mould in only one direction, corresponding to the longitudinal direction of the motor vehicle when the shield 8 is fixed to the chassis 4. Thus, the frame 22 may be produced easily, at a low manufacturing cost. The cellular structure of the vertical members 28 allows small, or even no, clearances, and this limits the weight and manufacturing cost of the shield 8. The parts obtained are therefore light and economical in terms of materials.

The cellular structure of the vertical members also enables the local thickness of the walls delimiting the cells 32, 34 to be reduced. Thus, said local thickness may be reduced within a range of 2.5 to 4 mm, advantageously between 3 mm and 3.5 mm.

Moreover, in general, the withdrawal of the one-piece shield 8 from the mould is facilitated because the small clearances or the absence of clearances allows withdrawal from the mould by a movement of two opposed half moulds in opposite directions along an axis corresponding to the longitudinal axis of the vehicle. It is therefore not necessary to provide sliders or moveable parts in the mould.

Moreover, the small or even non-existent clearances in the vertical members 28 in chequered formation allows uniform stiffness to be obtained during longitudinal indentation, for example during a medium-speed impact. It is therefore possible to obtain a level of stress which is substantially constant as a function of the movement, increasing the dissipated energy and reducing the absorption travel, but which remains below the calibration force of the longitudinal members 12, 16 defined above.

The result is that the energy of an impact may be dissipated by means of a shorter travel, and the solution is very compact. This solution is therefore particularly suitable for vehicles with a small cubic capacity having a longitudinal impact absorption travel of less than 250 mm, and in particular less than 200 mm. The vertical members 28 have a longitudinal thickness of between 120 and 220 mm. This provides effective energy absorption, while limiting the projection of the shield 8 taken between the mounting plates 20 and the front end of the shield 8.

Moreover, for a laterally offset pedestrian impact, in particular for distances located more than 300 mm from the centre of the members 30, the reduction in deceleration occurs preferably by pure, very localised compression of the vertical members 28 in chequered format over a travel of about 50 mm.

Figure 5:
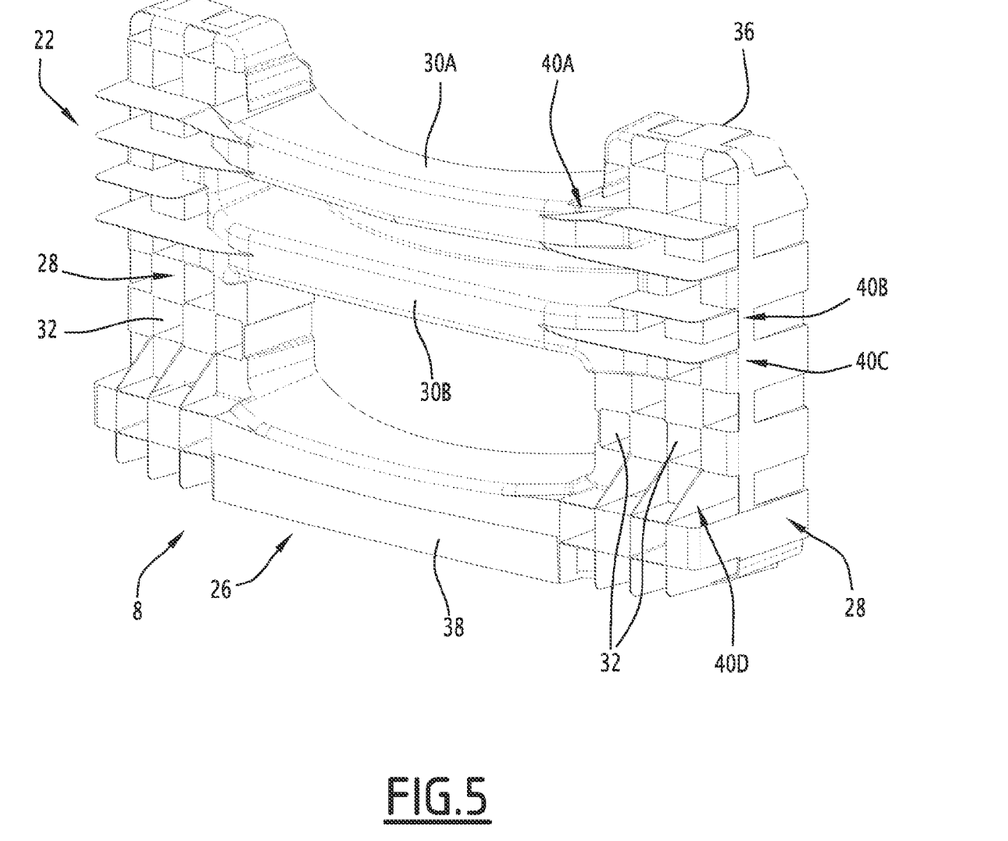
FIGS. 5 and 6 are views similar to those of FIGS. 1 and 2 of a second front bumper assembly according to the invention.
Figure 6:
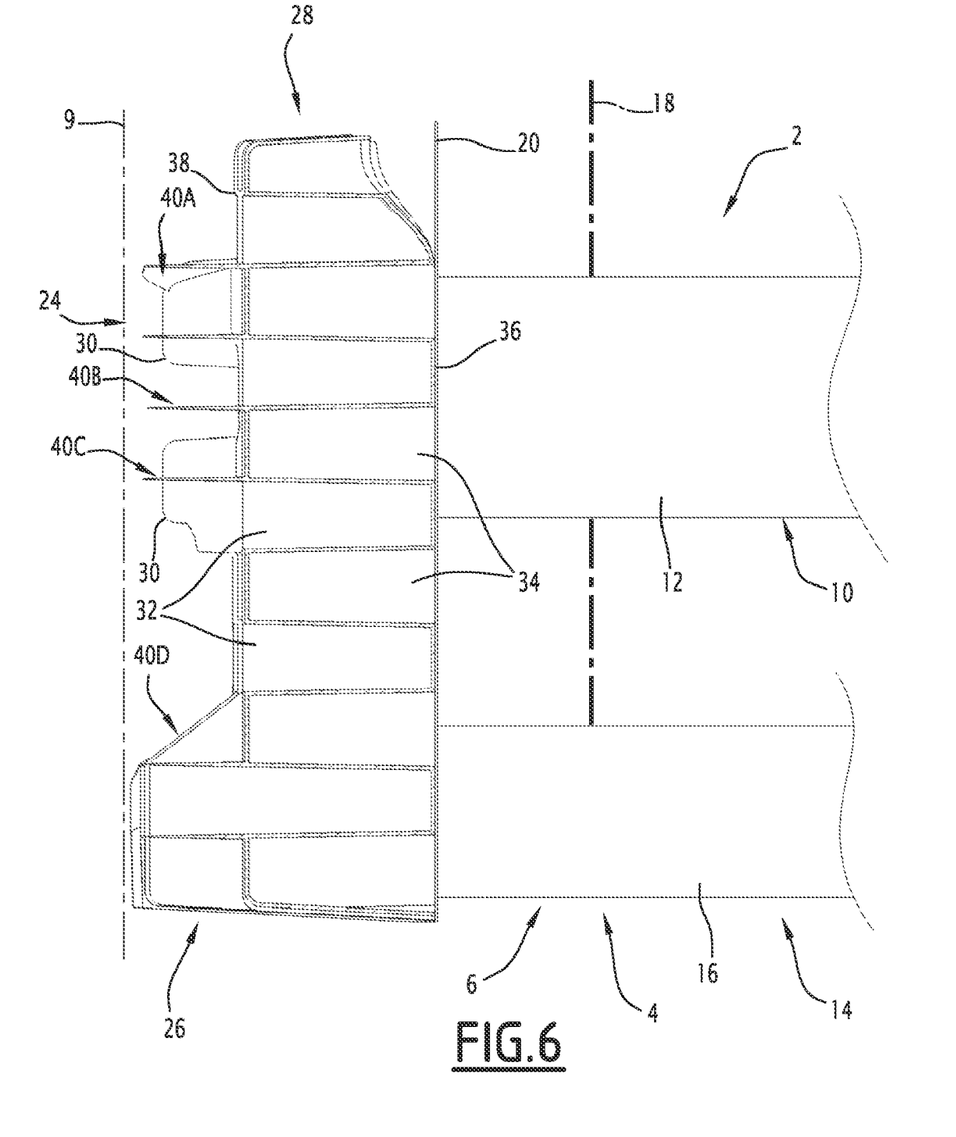

Optionally, the energy of a pedestrian impact may be absorbed by a set of ribs 40A, 40B, 40C, 40D integral with the shield 8 projecting forwards from the vertical members 28, as illustrated in FIG. 5. These ribs 40A, 40B, 40C, 40D fill the space between the shell 9 and the vertical members 28.

They are relatively flexible in order to be crushed longitudinally more easily than the vertical members 28. They thus define a first more flexible energy absorption zone in front of each more rigid vertical member 28. They thus allow the energy from a pedestrian impact to be absorbed over a travel of close to 50 mm, while deceleration remains below 150 g.

The ribs 40A, 40B, 40C, 40D have for example a low vertical thickness (<3 mm) in order to have adequate flexibility.

As illustrated in FIG. 5, the shield 8 comprises upper ribs 40A at the level of the upper member 30A, intermediate ribs 40B, ribs 40C at the level of the lower member 30B and lower ribs 40D.

The ribs 40A to 40C project longitudinally and substantially horizontally in front of the front face 38 of each vertical member 28, over the entire width of the vertical member 28.

The upper ribs 40A extend laterally towards the centre of the member 30 so as to be applied to the front surface of the upper member 30A and the ribs 40C extend laterally towards the centre of the member 30B so as to be applied to the front surface of the lower member 30B.

The intermediate members 40B are arranged between the upper member 30A and the lower member 30B.

The lower members 40D project vertically in front of the vertical members in a region of vertical members situated just above the lower beam 26.

Said front ribs 40A to 40D define flexible energy absorption zones in front of the lateral regions of the members 30A, 30B and of the more rigid vertical members 28, so that during a median or lateral pedestrian impact, deceleration remains lower than the norm.

In variants, the one-piece shield 8 has additional light units (not illustrated), panel fixing elements (not illustrated) for the shell of the shield, radiator grille fixing elements (not illustrated), or guided flaps that can be arranged behind the radiator grille for optimal air guidance.

What is claimed is:

1. A front assembly for a motor vehicle, comprising:
    a pair of vertical mounting plates, each vertical mounting plate configured to be mounted to a front end of one of a pair of upper longitudinal members of a chassis of the vehicle, and to a front end of one of a pair of lower longitudinal members of the chassis of the vehicle; and
    a front bumper shield comprising a one-piece plastic material frame with an upper bumper beam, a lower bumper beam, and two vertical impact absorbers connecting the upper and lower bumper beams at opposite ends of the upper and lower bumper beams, each of the two vertical impact absorbers each having rear faces configured to be fixed directly against a surface of one of the vertical mounting plates,
    wherein the two vertical impact absorbers have a cellular structure consisting of cells extending longitudinally through the two impact absorbers and opening onto at least one of the rear face and a front face of the bumper shield, and
    wherein the upper bumper beam is distanced from the lower bumper beam to form an open space within the front bumper shield extending continuously along a horizontal distance between a first of the two vertical impact absorbers to a second of the two vertical impact absorbers.

2. The assembly according to claim 1, wherein the upper bumper beam comprises two parallel horizontal cross members distanced vertically from each other to form another opening within the front bumper shield extending continuously along another horizontal distance between from the first of the two vertical impact absorbers to the second of the two vertical impact absorbers.

3. The assembly according to claim 1, wherein the vertical impact absorbers have a thickness of between 120 and 220 mm.

4. The assembly according to claim 2, wherein the vertical impact absorbers have a thickness of between 120 and 220 mm.

5. The assembly according to claim 1, wherein each vertical impact absorber comprises first blind cells, closed on a rear face side and open on a front face side, and second blind cells open on the rear face side and closed on the front face side.

6. The assembly according to claim 2, wherein each vertical impact absorber comprises first blind cells, closed on a rear face side and open on a front face side, and second blind cells open on the rear face side and closed on the front face side.

7. The assembly according to claim 1, further comprising:
    at least one impact absorption rib projecting forwards from the vertical impact absorbers.

8. The assembly according to claim 7, wherein the at least one impact absorption rib extends laterally to be applied to the upper bumper beam or the lower bumper beam.

9. The assembly according to claim 2, further comprising:
    at least one impact absorption rib projecting forwards from the vertical impact absorbers.

10. The assembly according to claim 9, wherein the at least one impact absorption rib extends laterally to be applied to the upper bumper beam or the lower bumper beam.

* * * * *